United States Patent
Schmidt et al.

(10) Patent No.: US 9,912,475 B2
(45) Date of Patent: Mar. 6, 2018

(54) VEHICULAR ENTROPY FOR RANDOM NUMBER GENERATION

(71) Applicant: Toyota Motor Engineering & Manufacturing North America, Inc., Erlanger, KY (US)

(72) Inventors: Eric R. Schmidt, Northville, MI (US); Jeffrey E. Pierfelice, Canton, MI (US)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 89 days.

(21) Appl. No.: 14/805,470

(22) Filed: Jul. 22, 2015

(65) Prior Publication Data

US 2017/0026176 A1    Jan. 26, 2017

(51) Int. Cl.
*H04L 9/08* (2006.01)

(52) U.S. Cl.
CPC .................. *H04L 9/0861* (2013.01)

(58) Field of Classification Search
CPC ..................................... H04L 9/0861
USPC ....................................... 713/168
See application file for complete search history.

(56) References Cited

U.S. PATENT DOCUMENTS

| 8,015,224 | B1 | 9/2011 | Chaichanavong et al. |
| 8,190,666 | B2 | 5/2012 | Suzuki et al. |
| 8,761,390 | B2 | 6/2014 | Peirce et al. |
| 2013/0013931 | A1* | 1/2013 | O'Hare ............... G06F 21/62 713/189 |
| 2013/0282781 | A1 | 10/2013 | Park et al. |
| 2014/0079217 | A1* | 3/2014 | Bai .................. H04L 63/0869 380/270 |
| 2015/0038073 | A1* | 2/2015 | Vang ................. H04W 76/02 455/41.1 |

OTHER PUBLICATIONS

Kelsey et al.; "Yarrow-160: Notes on the Design and Analysis of the Yarrow Cryptographic Pseudorandom Number Generator"; Lecture Notes in Computer Science; 2000; pp. 1-14; vol. 1758; (14 pages).

* cited by examiner

*Primary Examiner* — Kambiz Zand
*Assistant Examiner* — Benjamin Kaplan
(74) *Attorney, Agent, or Firm* — Christopher G. Darrow; Darrow Mustafa P.C.

(57) ABSTRACT

A method is provided for producing cryptographic keys, while a vehicle is in operation, for use in secure vehicle communications. The method may include obtaining unique entropy data from an entropy source based on dynamically changing, transient variables related to the operation of the vehicle, optionally in a driving mode. The method may include seeding a random number generator with the unique entropy data to generate at least one random number. A plurality of cryptographic keys are generated based on the at least one random number. A secure communication exchange may be established using the plurality of cryptographic keys. A non-transitory computer-readable medium is also provided having instructions embodied thereon that, when executed by a processor, perform the above operations as an algorithm in a vehicle.

14 Claims, 1 Drawing Sheet

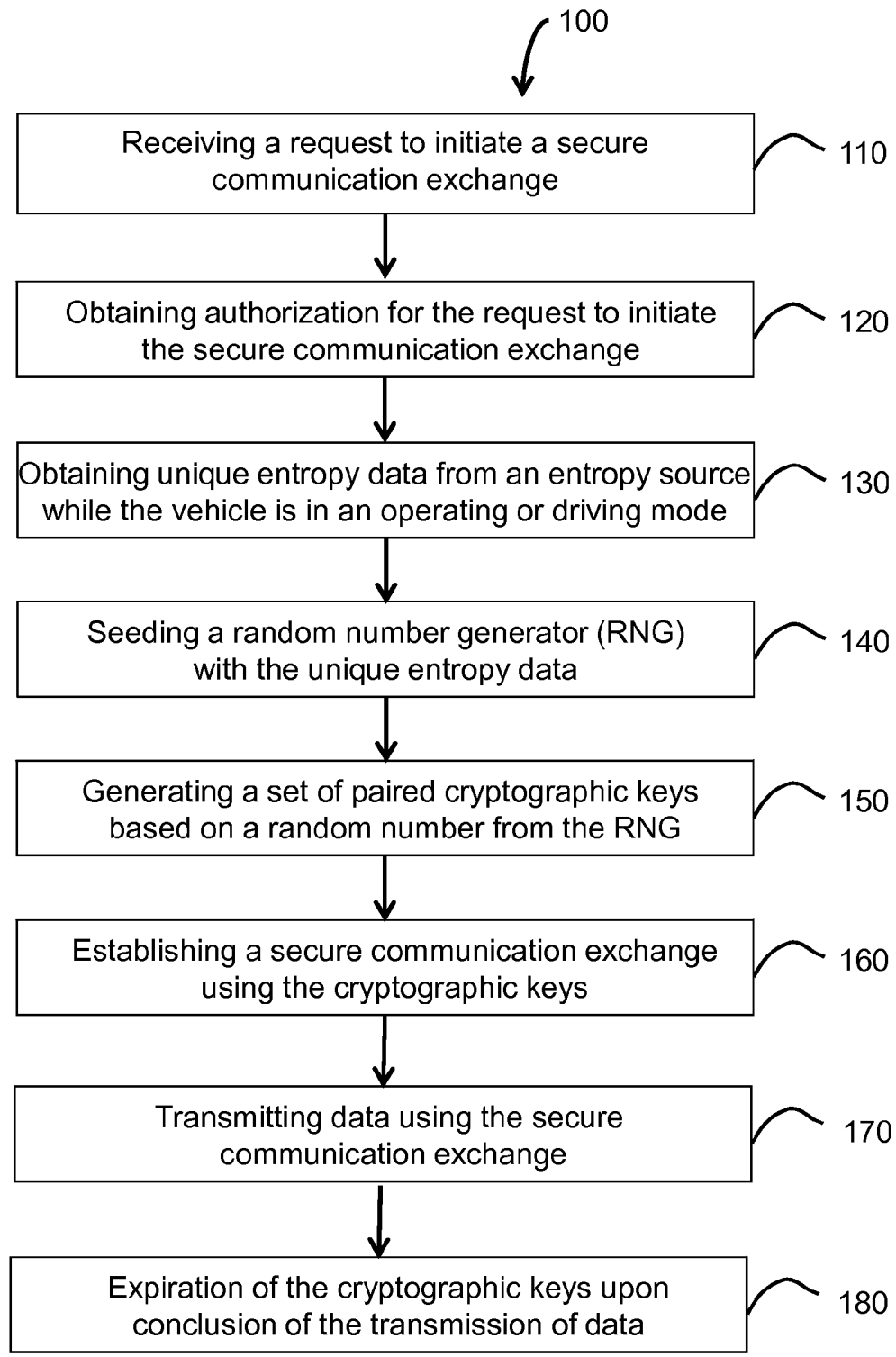

VEHICULAR ENTROPY FOR RANDOM NUMBER GENERATION

TECHNICAL FIELD

The present disclosure generally relates to vehicle communications, and more particularly, to systems and methods for providing a seed for generating a random number that may be used to establish secure communications.

BACKGROUND

The background description provided herein is for the purpose of generally presenting the context of the disclosure. Work of the presently named inventors, to the extent it may be described in this background section, as well as aspects of the description that may not otherwise qualify as prior art at the time of filing, are neither expressly nor impliedly admitted as prior art against the present technology.

Vehicles are progressively provided with various features that may require communications for their proper operation. The communications may be internally between vehicle assemblies, and externally with other vehicles. As such, it becomes increasingly important for the implementation and use of proper security features, commonly through the use of cryptographic applications. Many vehicular applications use true or pseudo-random numbers with cryptography. For example, random numbers can be used in the generation of keys for various cryptographic applications.

Random number generation techniques are known. In various aspects, whether or not a number can truly be considered "random" depends, at least in part, on what is referred to as a random number seed that forms the basis of the number. A random number seed is commonly a number or vector used to initialize a random number generator. Generally, when a secret encryption key is pseudo-randomly generated, having the random number seed will allow one to obtain the key. For example, two or more systems using matching algorithms and matching seeds can generate matching sequences of non-repeating numbers that can be used to synchronize remote systems. As such, the basis for a good random number seed is becoming increasingly important, particularly with regard to features and aspects used to establish secure communications.

Preferably, the output produced by number generating algorithms will generally follow a probability distribution in a pseudo-random manner. Various means of entropy may be taken from quantum mechanics, such as through radioactive decay, thermal noise, radio noise, and the like. However, due to the nature of certain measurements, there can be varying levels of biases that may affect the true randomness of numbers based on such entropic sources. Random number seeds may also be obtained using computational methods, such as a linear congruential generator algorithm. However, these methods may require the use of a real time clock, which may not be present in certain vehicles. Further, these methods may be considered to only produce pseudo-random numbers.

Accordingly, it would be desirable to provide an improved system and method for providing a seed for generating a random number that may be used with various secure communications.

SUMMARY

This section provides a general summary of the disclosure, and is not a comprehensive disclosure of its full scope or all of its features.

In various aspects, the present teachings provide a method for producing cryptographic keys, while a vehicle is in operation, for use in secure vehicle communications. The method may include obtaining unique entropy data from at least one entropy source based on dynamically changing, transient variables related to the operation of the vehicle in an operating mode. The method may include seeding a random number generator with the unique entropy data to generate at least one random number. A plurality of cryptographic keys may be generated based on the at least one random number. A secure communication exchange may be established using the plurality of cryptographic keys.

In other aspects, the present teachings provide a method for providing a seed for generating a random number during vehicle operation and enabling secure data communications. The method may include receiving a request to initiate a secure communication exchange. Unique entropy data may be obtained from an entropy source while the vehicle is in an operating mode or in a driving mode. The method may include seeding a random number generator with the unique entropy data to generate at least one random number. A set of paired cryptographic keys may be generated based on the at least one random number. The method may include transmitting a first cryptographic key to a first unit, and transmitting a second cryptographic key to a second unit. The secure communication exchange may be established using the first and second cryptographic keys. The method may include transmitting data between the first unit and the second unit using the secure communication exchange.

In still other aspects, the present teachings provide a non-transitory computer-readable medium having instructions embodied thereon that, when executed by a processor, perform operations in a vehicle. The operations include receiving a request to initiate a secure communication exchange. The operations may include obtaining unique entropy data from an entropy source having dynamically changing, transient variables while the vehicle is in an operating mode or in a driving mode. The operations may further provide the unique entropy data to a random number generator as a seed to generate at least one random number. A set of paired cryptographic keys may be generated based on the at least one random number. The operations may include transmitting a first cryptographic key to a first unit, and transmitting a second cryptographic key to a second unit. The operations may include establishing the secure communication exchange using the first and second cryptographic keys, and transmitting data between the first unit and the second unit using the secure communication exchange.

In the various methods and operations discussed above, the unique entropy data may be based on a measurement of a physical property of the vehicle, including but not limited to: an angular speed of a wheel, a revolutions per minute (RPM) value of an engine, a level of compression of a shock, a speed of a blower motor, a measurement of cabin noise, a mileage or distance reading, a fill level of a fuel tank, and combinations thereof.

Further areas of applicability and various methods of enhancing the above coupling technology will become apparent from the description provided herein. The description and specific examples in this summary are intended for purposes of illustration only and are not intended to limit the scope of the present disclosure.

BRIEF DESCRIPTION OF THE DRAWINGS

The present teachings will become more fully understood from the detailed description and the accompanying drawings, wherein:

FIG. 1 is a flow chart of an exemplary control process algorithm useful with the present teachings.

It should be noted that the FIGURES set forth herein are intended to exemplify the general characteristics of the methods, algorithms, and devices among those of the present technology, for the purpose of the description of certain aspects. These FIGURES may not precisely reflect the characteristics of any given aspect, and are not necessarily intended to define or limit specific embodiments within the scope of this technology. Further, certain aspects may incorporate features from a combination of FIGURES.

DETAILED DESCRIPTION

The following description is merely illustrative in nature and is in no way intended to limit the disclosure, its application, or uses. As used herein, the phrase at least one of A, B, and C should be construed to mean a logical (A or B or C), using a non-exclusive logical "or." It should be understood that the various steps within a method may be executed in different order without altering the principles of the present disclosure. Disclosure of ranges includes disclosure of all ranges and subdivided ranges within the entire range.

The headings (such as "Background" and "Summary") and sub-headings used herein are intended only for general organization of topics within the present disclosure, and are not intended to limit the disclosure of the technology or any aspect thereof. The recitation of multiple embodiments having stated features is not intended to exclude other embodiments having additional features, or other embodiments incorporating different combinations of the stated features.

As used herein, the terms "comprise" and "include" and their variants are intended to be non-limiting, such that recitation of items in succession or a list is not to the exclusion of other like items that may also be useful in the devices and methods of this technology. Similarly, the terms "can" and "may" and their variants are intended to be non-limiting, such that recitation that an embodiment can or may comprise certain elements or features does not exclude other embodiments of the present technology that do not contain those elements or features.

The broad teachings of the present disclosure can be implemented in a variety of forms. Therefore, while this disclosure includes particular examples, the true scope of the disclosure should not be so limited since other modifications will become apparent to the skilled practitioner upon a study of the specification and the following claims. Reference herein to one aspect, or various aspects means that a particular feature, structure, or characteristic described in connection with an embodiment or particular system is included in at least one embodiment or aspect. The appearances of the phrase "in one aspect" (or variations thereof) are not necessarily referring to the same aspect or embodiment. It should be also understood that the various method steps discussed herein do not have to be carried out in the same order as depicted, and not each method step is required in each aspect or embodiment.

In addition to vehicle components being in constant communication with one another, it is becoming increasingly important that vehicles themselves are also connected with one another using various communications. The increase in both the number of vehicles, as well as the number of communications between the vehicles, calls for the use of an increased level of security for those communications. The present technology generally concerns systems and methods of producing random number seeds that can subsequently be used for the creation of random numbers that support various cryptographic functions related to the operation or control of a vehicle. The systems and methods may include obtaining unique entropy data from an entropy source while a vehicle is operating in a driving mode, and then seeding a random number generator with the unique entropy data to generate at least one random number. Thereafter, a plurality of cryptographic keys, or the like, may be generated based on the at least one random number. A secure communication exchange may be established using the plurality of cryptographic keys.

As used herein, the term "vehicle" should be construed having a broad meaning, and should include all types of vehicles, with non-limiting examples including a passenger or commercial automobile, car, truck, motorcycle, off-road vehicle, bus, boat, airplane, helicopter, lawn mower, recreational vehicle, amusement park vehicle, farm vehicle, construction vehicle, tram, golf cart, train, or trolley, etc. In various instances, vehicles useful with the present technology may be partially or fully autonomous vehicles.

There are many applications of true or pseudo-random numbers that can be useful in vehicle use. Although there are various means of entropy that can be taken from quantum mechanics, the methods disclosed herein may include obtaining unique entropy data from entropy sources that have an increased likelihood for random numbers. As discussed in more detail below, for example, the present methods preferably utilize entropy sources that are based on dynamically changing, transient variables that are related to the operation of the vehicle, for example, utilizing entropy sources when a vehicle is in an operating mode or operation mode, i.e., with the ignition on and irrespective of vehicle movement, or in a driving mode.

In various examples, the operating mode of a vehicle can be defined as when a vehicle is in an "on" or "standby" mode. For example, when a vehicle engine is running or a power generating source is operating, or when various vehicle systems are working to support vehicle movement. In other examples, the driving mode of a vehicle can be defined as when a vehicle is in an "on" or "standby" mode and a transmission or the like, where applicable, may be in a drive gear. It is contemplated that the driving mode preferably includes instances when the vehicle is in motion, i.e., while driving, but does not necessarily exclude short instances where the vehicle is not in motion, such as when a vehicle is in an operational mode, but briefly stopped. Alternatively, when a vehicle is parked, stationary for an indefinite time period, or is otherwise purposefully placed in an "off" mode, the vehicle may not be considered to be in the driving mode.

FIG. 1 is a flow chart of an exemplary control process method and non-limiting algorithm 100 useful with the present teachings. The functions, methods, and steps are disclosed in terms of block diagrams, however, it should be understood that these functions may be enacted or performed in dedicated hardware circuitry or programmed software routines as a computer readable storage medium capable of execution as instructions in a microprocessor based electronics control embodiment, such as a control system. In other words, memory is one example of a non-transitory computer-readable medium/storage media having embodied thereon computer-useable instructions such as the algorithms that, when executed, performs a method for providing a seed for generating a random number during vehicle operation, and enabling secure communications.

The teachings of the present technology may be used with known control systems and may generally include a computing device, such as a control module with a processor, a memory, and an interface. It should be understood that although the particular systems or subsystems may be separately defined, each or any of the systems may be otherwise modified, combined, or segregated via appropriate hardware and/or software as is known to those of ordinary skill in the art. The control module may be a portion of a central vehicle control, a stand-alone unit, or other system, including cloud based. Alternatively, the control module can be composed of multiple computing devices. The processor may be any type of conventional microprocessor having desired performance characteristics and capable of manipulating or processing data and other information. The memory may include any type of computer readable medium that stores data and control algorithms described in more detail below. Other operational software for the processor may also be stored in the memory. The interface may facilitate communication with other systems, sensors, and other on-board systems. On-board systems may include, but are not limited to, a vehicle head unit, vehicle diagnostic sensors, vehicle entertainment systems, vehicle automated controls, and the like. The control module can also include secondary, additional, or external storage, for example, a memory card, flash drive, or any other form of computer readable medium. Installed applications can be stored in whole or in part in the external storage and loaded into the memory as needed for processing.

In various aspects, the control process methods and algorithms provide a seed that may be used for generating a random number during vehicle operation, especially while driving, ultimately enabling secure communications and/or the secure exchange of data. With reference to step 110 of FIG. 1, the method may include receiving a request to initiate a secure communication exchange. The request to initiate the secure communication may be from an internal vehicle system, vehicle sub-system, vehicle module, or the like. For example, in various instances, the request to initiate the communication may come from what is referred herein to as a "trusted source," where the identity is known and communications are proper and should be sent in a secure manner.

In various other aspects, the request to initiate the secure communication may be from a device or external source that may not be a known trusted source. Accordingly, external sources requesting a secure communication may need to be verified in one or more manner. In one example, the device or external source is a remote processor or module external to the vehicle, such as a device from another vehicle that may be used to set up various vehicle-to-vehicle communications. In various aspects, the device may be associated with an autonomous vehicle or system thereof that may need to initiate the secure communication or data exchange.

With reference to step 120 of FIG. 1, the methods may optionally include obtaining authorization for the request to initiate the secure communication exchange from an operator, passenger, or controller of the vehicle prior to establishing the secure communication exchange. Obtaining proper authorization may assist in the prevention of unwanted or unnecessary requests, as well as minimizing or preventing inappropriate access to data within the vehicle or access to control features of the vehicle. Solicitation of feedback that signifies authorization may be accomplished in numerous known ways to prevent unauthorized exchanges of data or communications, and can include various known authentication techniques. The communication system, discussed above, may provide visual notifications to an area of the dashboard for notifications to a driver or user of the vehicle. In one example, a notification may include an alert or request for initiating a secure communication exchange, seeking authorization from the user or controller of the vehicle. The communication system may also include an appropriate wireless communication system that is operable to communicate with other vehicles and drivers using known vehicle-to-vehicle or inter-vehicle communication systems. The communication system may also communicate with a personal electronic device such as a smart phone, tablet, or other wearable device, such as a smart watch, smart glasses, or other device. In various aspects, the communication system also includes a positional system, such as a GPS device, to determine the location of the vehicle. Other methods of protecting communications with certificate authority can be found in U.S. Pat. No. 8,230,215 titled, "Methods for Allocating Multiple Authentication Certificates to Vehicles in a Vehicle-to-Vehicle Communication Network," issued on Jul. 24, 2012, the disclosure of which is incorporated by reference herein in its entirety.

As discussed above, unique entropy data may be obtained from an entropy source taken or measured while the vehicle is operating in a driving mode, as referenced in step 130 of FIG. 1. In the various methods and operations discussed herein, the unique entropy data may be based on a measurement of a physical property of the vehicle. Preferably the physical property is transient, and dynamically changing when the vehicle is operating in the driving operational mode. Non-limiting examples of such transient data may include features related to motion, such as an angular speed of a wheel of the vehicle; features related to power generation of the vehicle, such as a revolutions per minute (RPM) value of an engine or available voltage of a fuel cell; features related to changing suspension of the vehicle, such as a level of compression of a shock or spring; features related to climate control, heating, and/or cooling, such as a speed of a blower motor; features related to sounds emitted by or received by the vehicle, such as a measurement of cabin noise, or of an engine compartment; features related to travel, such as an instant mileage or distance reading; features related to changing fluid levels, such as a fill level of a fuel tank; and combinations thereof.

In various aspects, the unique entropy data may be obtained from a plurality of different entropy sources and the separate measurements may be collected together in what can be referred to as a pool or collection of data. In this regard, at least a portion of the unique entropy data may be combined, concatenated, or truncated as is known in the art. The data may be stored in memory located in the vehicle or otherwise accessible to the vehicle.

With reference to step 140 of FIG. 1, the methods of the present technology may include seeding a random number generator with the unique entropy data to generate at least one random number. Random number generators and pseudo-random number generators are commonly known in the art. In various aspects, the method may include selecting data from the pool of data as a seed. The data selection may be performed using known techniques for the selection of data, and the selection process may be random itself.

With reference to step 150 of FIG. 1, a set of paired cryptographic keys may be generated based on the at least one random number obtained from the random number generator in step 140. In one example, the method may include transmitting a first cryptographic key to a first unit, and transmitting a second cryptographic key to a second unit. The first unit may be a first device or first processing unit that is part of the vehicle or a component of a vehicle system, sub-system, or vehicle module. The second unit may be a second device or second processing unit that is also part of the vehicle or a component of a vehicle system, sub-system, or vehicle module. Alternatively, the second unit may be completely external to the vehicle, or it may be another vehicle, such as an autonomous vehicle. In this example, the first key can be a private cryptographic key, and the second key can be a public cryptographic key.

With reference to step 160 of FIG. 1, the secure communication exchange may be established using the first and second cryptographic keys as is known in the art. For example, using public-key cryptography, or the like. As shown in step 170 of FIG. 1, the method may include transmitting data between the first unit and the second unit using the secure communication exchange. In various aspects, the methods may include configuring at least one or both of the first and second cryptographic keys to expire upon conclusion of the transmission of data using the secure communication exchange, as shown in step 180 of FIG. 1. Alternatively, the keys could be configured to expire after a predetermined time period.

In still other aspects, the present teachings provide a non-transitory computer-readable medium having instructions embodied thereon that, when executed by a processor, perform operations in a vehicle. The operations are similar to those described above with reference to FIG. 1. For example, the operations may include receiving a request to initiate a secure communication exchange (step 110). The request may be internally from the vehicle, or from a device external to the vehicle. Optionally, the operations may include obtaining authorization for the request to initiate the communication exchange (step 120). The operations may include obtaining unique entropy data from an entropy source having dynamically changing, transient variables while the vehicle is operating in a driving mode (step 130). Unique entropy data similarly be obtained from a plurality of different entropy sources, which may be collected in a pool of data. A portion of the pool of data may be combined, concatenated, or truncated as described above. The operations may further provide the unique entropy data to a random number generator as a seed to generate at least one random number (step 140). A set of paired cryptographic keys may be generated based on the at least one random number (step 150). The operations may include transmitting a first cryptographic key to a first unit, and transmitting a second cryptographic key to a second unit. The operations may include establishing the secure communication exchange using the first and second cryptographic keys (step 160), and transmitting data between the first unit and the second unit using the secure communication exchange (step 170).

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations should not be regarded as a departure from the disclosure, and all such modifications are intended to be included within the scope of the disclosure.

What is claimed is:

1. A method for producing cryptographic keys while a vehicle is in operation for use in secure vehicle communications, the method comprising:

obtaining unique entropy data from an entropy source of dynamically changing, transient measured variables of the operation of the vehicle while the vehicle is in an operating mode;

seeding a random number generator with the unique entropy data to generate at least one random number;

generating a plurality of cryptographic keys from the at least one random number; and establishing a secure communication exchange using the plurality of cryptographic keys, wherein the unique entropy data is data of a measurement of a physical property of the vehicle selected from the group consisting of: an angular speed of a wheel, a revolutions per minute (RPM) value of an engine, a level of compression of a shock, a speed of a blower motor, a measurement of cabin noise, a mileage or distance reading, a fill level of a fuel tank, and combinations thereof.

2. The method according to claim 1, wherein the unique entropy data is obtained from concatenating or truncating at least a portion of data taken from a plurality of different entropy sources and collected in a pool of data, and the step of seeding the random number generator with unique entropy data comprises randomly selecting data from the pool of data as a seed.

3. A method for providing a seed for generating a random number during vehicle operation and enabling secure data communications, the method comprising:

receiving a request to initiate a secure communication exchange;

obtaining unique entropy data from an entropy source of dynamically changing, transient measured variables of the operation of the vehicle while the vehicle is in an operating mode;

seeding a random number generator with the unique entropy data to generate at least one random number;

generating a set of paired cryptographic keys from the at least one random number;

transmitting a first cryptographic key to a first unit;

transmitting a second cryptographic key to a second unit;

establishing the secure communication exchange using the first and second cryptographic keys; and transmitting data between the first unit and the second unit using the secure communication exchange, wherein the unique entropy data is data of a measurement of a physical property of the vehicle selected from the group consisting of: an angular speed of a wheel, a revolutions per minute (RPM) value of an engine, a level of compression of a shock, a speed of a blower motor, a measurement of cabin noise, a mileage or distance reading, a fill level of a fuel tank, and combinations thereof.

4. The method according to claim 3, wherein the unique entropy data is obtained from concatenating or truncating at least a portion of data taken from a plurality of different entropy sources and collected in a pool of data, and the step of seeding the random number generator with unique entropy data comprises randomly selecting data from the pool of data as a seed.

5. The method according to claim 3, wherein the request to initiate the secure communication exchange is from a device external to the vehicle.

6. The method according to claim 5, further comprising obtaining authorization for the request to initiate the secure communication exchange from an operator or passenger of the vehicle prior to establishing the secure communication exchange.

7. The method according to claim 5, wherein the device is a remote processor or module.

8. The method according to claim 5, wherein the device is associated with an autonomous vehicle.

9. The method according to claim 3, wherein the request to initiate the secure communication is from an internal vehicle system, sub-system, or module.

10. The method according to claim 3, further comprising configuring at least one of the first and second cryptographic keys to expire upon conclusion of the transmission of data using the secure communication exchange.

11. A non-transitory computer-readable medium having instructions embodied thereon that, when executed by a processor, perform operations in a vehicle, the operations comprising:

receiving a request to initiate a secure communication exchange;

obtaining unique entropy data from an entropy source having dynamically changing, transient measured variables while the vehicle is in an operating mode;

providing the unique entropy data to a random number generator as a seed to generate at least one random number;

generating a set of paired cryptographic keys from the at least one random number;

transmitting a first cryptographic key to a first unit;

transmitting a second cryptographic key to a second unit;

establishing the secure communication exchange using the first and second cryptographic keys; and transmitting data between the first unit and the second unit using the secure communication exchange, wherein the operations comprise obtaining unique entropy data of a measurement of a physical property of the vehicle selected from the group consisting of: an angular speed of a wheel, a revolutions per minute (RPM) value of an engine, a level of compression of a shock, a speed of a blower motor, a measurement of cabin noise, a mileage or distance reading, a fill level of a fuel tank, and combinations thereof.

12. The non-transitory computer-readable medium as recited in claim 11, wherein the operations comprise concatenating or truncating at least a portion of unique entropy data from a plurality of different entropy sources that is collected in a pool of data, and the step of providing the unique entropy data to a random number generator as the seed comprises randomly selecting data from the pool of data as the seed.

13. The non-transitory computer-readable medium as recited in claim 11, wherein the operational step of receiving the request to initiate the secure communication exchange comprises receiving the request from a device external to the vehicle.

14. The non-transitory computer-readable medium as recited in claim 11, wherein the operations further comprise obtaining authorization for the request to initiate the secure communication exchange from an operator or passenger of the vehicle prior to establishing the secure communication exchange.

* * * * *